(12) United States Patent
Lee

(10) Patent No.: US 10,739,215 B2
(45) Date of Patent: Aug. 11, 2020

(54) SENSOR APPARATUS

(71) Applicant: LG INNOTEK CO., LTD., Seoul (KR)

(72) Inventor: Chang Hwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/302,560

(22) PCT Filed: May 17, 2017

(86) PCT No.: PCT/KR2017/005116
§ 371 (c)(1),
(2) Date: Nov. 16, 2018

(87) PCT Pub. No.: WO2017/200296
PCT Pub. Date: Nov. 23, 2017

(65) Prior Publication Data
US 2019/0178733 A1 Jun. 13, 2019

(30) Foreign Application Priority Data

May 17, 2016 (KR) .................. 10-2016-0060078
Jul. 25, 2016 (KR) .................. 10-2016-0094241

(51) Int. Cl.
*G01L 3/00* (2006.01)
*G01L 3/10* (2006.01)
(Continued)

(52) U.S. Cl.
CPC ............ *G01L 3/101* (2013.01); *B62D 6/10* (2013.01); *G01D 11/24* (2013.01); *G01L 3/02* (2013.01);
(Continued)

(58) Field of Classification Search
CPC ... G01L 3/101; G01L 3/02; G01L 3/10; G01L 5/12; G01L 5/22; G01L 5/221; B62D 6/10; B62D 5/0481; G01D 11/24
(Continued)

(56) References Cited

U.S. PATENT DOCUMENTS

2008/0224553 A1* 9/2008 Abe ..................... H02K 5/15
310/71
2010/0295392 A1* 11/2010 Utsumi ................. H02K 1/145
310/71
(Continued)

FOREIGN PATENT DOCUMENTS

EP 2 730 902 5/2014
EP 2 860 504 4/2015
(Continued)

OTHER PUBLICATIONS

International Search Report (with English Translation) and Written Opinion dated Aug. 2, 2017 issued in Application No. PCT/KR2017/005116.
European Search Report dated Apr. 15, 2019 issued in Application No. 17799653.5.

*Primary Examiner* — Max H Noori
(74) *Attorney, Agent, or Firm* — KED & Associates LLP

(57) ABSTRACT

The present invention provides a sensor apparatus including a rotor, a stator disposed outside the rotor, a sensing part configured to measure a magnetic field generated between the rotor and the stator, a housing which accommodates the rotor and the stator, a sensor module disposed in the housing, and a protrusion which protrudes from an outer circumferential surface of the housing and includes a spherical surface in point contact with an external fixing part.

10 Claims, 15 Drawing Sheets

(51) Int. Cl.
  *G01L 5/12* (2006.01)
  *B62D 6/10* (2006.01)
  *G01L 3/02* (2006.01)
  *G01L 5/22* (2006.01)
  *G01D 11/24* (2006.01)
  *B62D 5/04* (2006.01)

(52) U.S. Cl.
  CPC .................. *G01L 3/10* (2013.01); *G01L 5/12* (2013.01); *G01L 5/22* (2013.01); *B62D 5/0481* (2013.01); *G01L 5/221* (2013.01)

(58) Field of Classification Search
  USPC .................................................... 73/862.325
  See application file for complete search history.

(56) References Cited

U.S. PATENT DOCUMENTS

| | | |
|---|---|---|
| 2014/0123770 A1 | 5/2014 | Lee |
| 2014/0141653 A1* | 5/2014 | Hsieh .................. H01R 31/065 |
| | | 439/638 |
| 2015/0090051 A1 | 4/2015 | Lee |
| 2016/0214648 A1 | 7/2016 | Schoepe et al. |
| 2018/0003089 A1* | 1/2018 | Kim ..................... H02K 11/215 |

FOREIGN PATENT DOCUMENTS

| | | |
|---|---|---|
| KR | 10-1128608 | 3/2012 |
| KR | 10-2013-0109635 | 10/2013 |
| KR | 20-0470310 | 12/2013 |
| WO | WO 2014/090977 | 6/2014 |
| WO | WO 2014/095878 | 6/2014 |

\* cited by examiner

SENSOR APPARATUS

CROSS-REFERENCE TO RELATED PATENT APPLICATIONS

This application is a U.S. National Stage Application under 35 U.S.C. § 371 of PCT Application No. PCT/KR2017/005116, filed May 17, 2017, which claims priority to Korean Patent Application Nos. 10-2016-0060078, filed May 17, 2016, and 10-2016-0094241, filed Jul. 25, 2016, whose entire disclosures are hereby incorporated by reference.

TECHNICAL FIELD

The present invention relates to sensor apparatus.

BACKGROUND ART

Generally, a traveling direction of a vehicle is controlled by controlling a steering wheel connected to wheels. However, when resistance between the wheels and a road surface is high or a steering trouble factor occurs, steering control power may decrease, and thus rapid control may be difficult. In this case, an electric power steering system (EPS) is used in order to solve this problem. Such a power steering apparatus is an apparatus configured to use a power apparatus to control the steering wheel in order to reduce a control force.

In the EPS, an electronic control unit drives a motor according to traveling conditions detected by a vehicle speed sensor, a torque angle sensor, and a torque sensor and secures turning stability, and rapidly provides a restoring force so that a driver can stably drive.

The torque angle sensor may be functionally divided into a torque sensing module and a steering angle sensing module. The sensing modules are disposed inside a housing. The housing including the sensing modules is installed inside a column housing. Here, the housing is fixed to an inside of the column housing such that the housing does not rotates. Fixing structures may be provided on an outer circumferential surface of the housing and an inner wall of the column housing. However, general fixing structures are provided to completely restrict movement of the housing in order to secure fixability.

However, in a case in which the housing is completely restricted by the column housing, there are problems in that assemblability of the housing and the column housing is greatly reduced, and sensor performance is greatly reduced due to weakness against vibration.

DISCLOSURE

Technical Problem

The present invention is directed to providing sensor apparatus in which a coupling property between a sensor module and a column housing is secured and movability thereof is secured.

Objectives to be achieved by the embodiments of the present invention are not limited to the above-described objectives, and other objectives, which are not described above, may be clearly understood by those skilled in the art through the following specification.

Technical Solution

One aspect of the present invention provides a sensor apparatus including a rotor, a stator disposed outside the rotor, a sensing part configured to measure a magnetic field generated between the rotor and the stator, a housing which accommodates the rotor and the stator, and a fixing part which protrudes from an outer circumferential surface of the housing and includes a spherical surface in point contact with an external fixing part.

The protrusion may include a first clip and a second clip which protrude from the outer circumferential surface of the housing to face each other and between which an accommodation space in which the external protrusion is accommodated is formed.

Each of the first clip and the second clip may include a column portion formed on the outer circumferential surface of the housing and a tip portion which is formed at a leading end of the column portion and has the spherical surface.

The column portion may be elastically deformed, and a first distance which is a minimum distance from the tip portion of the first clip to the tip portion of the second clip may be less than a second distance which is a minimum distance from the column portion of the first clip to the column portion of the second clip.

The first distance may be less than a thickness of the external fixing part.

The column portion may be obliquely formed with respect to a reference line which passes through a center of a center hole in a radial direction.

Another aspect of the present invention provides a torque angle sensor including a rotor, a stator disposed outside the rotor, a sensing part configured to measure a magnetic field generated between the rotor and the stator, and a housing which accommodates the rotor and the stator, an angle sensor module and a torque sensor module which are disposed in the housing, and a protrusion which protrudes from an outer circumferential surface of the housing and includes a spherical surface in point contact with an external fixing part.

The protrusion may include a first clip and a second clip which protrude from the outer circumferential surface of the housing to face each other and between which an accommodation space in which the external protrusion is accommodated is formed.

Each of the first clip and the second clip may include a column portion formed on the outer circumferential surface of the housing and a tip portion which is formed at a leading end of the column portion and has the spherical surface.

The column portion may be elastically deformed, and a first distance which is a minimum distance from the tip portion of the first clip to the tip portion of the second clip may be less than a second distance which is a minimum distance from the column portion of the first clip to the column portion of the second clip.

The first distance may be less than a thickness of the external fixing part.

The column portion may be obliquely formed with respect to a reference line which passes through a center of a center hole in a radial direction.

Another aspect of the present invention may provide a steering apparatus including a torque angle sensor which includes a column housing including a rib formed to protrude from an inner surface of an inner wall thereof, a housing including a center hole, a torque sensor module and an angle sensor module which are disposed in the housing, and a protrusion which protrudes from the outer circumferential surface of the housing and includes a spherical surface in point contact with the rib.

The rib may include a flat contact surface in contact with the spherical surface.

Another aspect of the present invention may provide a torque sensor including a rotor, a stator disposed outside the rotor, a sensing part configured to measure a magnetic field generated between the rotor and the stator, and a housing which accommodates the rotor and the stator, wherein the housing includes protrusions which protrude from an outer circumferential surface thereof, and the protrusions include contact portions in contact with an external protrusion and elastic portions which elastically connect the housing to the contact portions.

The pair of the protrusions may protrude from the outer circumferential surface of the housing to face each other.

The elastic portions may include spherical surface.

The contact portions may include flat surfaces.

A first distance which is a minimum distance between contact portions of the pair of the protrusions may be less than a thickness of the external fixing part.

The contact portions of the pair of the protrusions may be disposed to face each other.

The protrusions may include stoppers which extend from ends of the contact portions.

The stoppers may extend toward the elastic portions.

Each of the contact portions may include an upper inclined surface and a lower inclined surface.

The upper inclined surface may be obliquely formed from the flat surface to an upper end surface of the contact portion, and the lower inclined surface may be obliquely formed from the flat surface to a lower end surface of the contact portions.

The contact portions may be in line contact with the external fixing part.

Another aspect of the present invention may provide a torque angle sensor including a rotor, a stator disposed outside the rotor, a sensing part configured to measure a magnetic field generated between the rotor and the stator, and a housing which accommodates the rotor and the stator, wherein the housing includes protrusions which protrude from an outer circumferential surface thereof, and the protrusions include contact portions in contact with an external protrusion and elastic portions which elastically connect the housing to the contact portions.

The contact portions may be in line contact with the external fixing part.

The pair of the protrusions may protrude from the outer circumferential surface of the housing to face each other.

The elastic portions may include spherical surface.

The contact portions may include flat surfaces.

A first distance which is a minimum distance between the contact portions of the pair of the protrusions may be less than a thickness of the external fixing part.

The contact portions of the pair of the protrusions may be disposed to face each other.

The protrusions may include stoppers which extend from the contact portions.

The stoppers may extend toward the elastic portions.

Each of the contact portions includes an upper inclined surface and a lower inclined surface, the upper inclined surface may be obliquely formed from the flat surface to an upper end surface of the contact portion, and the lower inclined surface may be obliquely formed from the flat surface to a lower end surface of the contact portion.

Another aspect of the present invention may provide a steering apparatus including a torque sensor which includes a rotor, a stator disposed outside the rotor, a sensing part configured to measure a magnetic field generated between the rotor and the stator, and a housing which accommodates the rotor and the stator, wherein the housing includes protrusions which protrude from an outer circumferential surface thereof, and the protrusions include contact portions in contact with an external protrusion and elastic portions which elastically connect the housing to the contact portions.

In the steering apparatus, the contact portions may be in line contact with the external fixing part.

In the steering apparatus, the pair of the protrusions may protrude from the outer circumferential surface of the housing to face each other.

In the steering apparatus, the elastic portions may include spherical surface.

In the steering apparatus, the contact portions may include flat surfaces.

In the steering apparatus, a first distance which is a minimum distance between the contact portions of the pair of the protrusions may be less than a thickness of the external fixing part.

In the steering apparatus, the contact portions of the pair of the protrusions may be disposed to face each other.

In the steering apparatus, the protrusions may include stoppers which extend from ends of the contact portions.

In the steering apparatus, the stoppers may extend toward the elastic portions.

In the steering apparatus, each of the contact portions may include an upper inclined surface and a lower inclined surface.

In the steering apparatus, the upper inclined surface may be obliquely formed from the flat surface to an upper end surface of the contact portion, and the lower inclined surface may be obliquely formed from the flat surface to a lower end surface of the contact portion.

In the steering apparatus, a column housing including a rib may be further included therein, and the torque sensor may be disposed in the column housing.

In the steering apparatus, the contact portions may be in contact with the rib.

In the steering apparatus, the rib may include spherical surface in contact with the contact portions.

In the steering apparatus, the rib may include a first rib and a second rib, and a space may be formed between the first rib and the second rib.

Another aspect of the present invention may provide a steering apparatus including a torque angle sensor which includes a rotor, a stator disposed outside the rotor, a sensing part configured to measure a magnetic field generated between the rotor and the stator, and a housing which accommodates the rotor and the stator, wherein the housing includes protrusions which protrude from an outer circumferential surface thereof, and the protrusions include contact portions in contact with an external protrusion and elastic portions which elastically connect the housing to the contact portions.

In the steering apparatus, the contact portions may be in line contact with the external fixing part.

In the steering apparatus, the pair of the protrusions may protrude from the outer circumferential surface of the housing to face each other.

In the steering apparatus, the elastic portions may include spherical surface.

In the steering apparatus, the contact portions may include flat surfaces.

In the steering apparatus, a first distance which is a minimum distance between the contact portions of the pair of the protrusions may be less than a thickness of the external fixing part.

In the steering apparatus, the contact portions of the pair of the protrusions may be disposed to face each other.

In the steering apparatus, the protrusions may include stoppers which extend from ends of the contact portions.

In the steering apparatus, the stoppers may extend toward the elastic portions.

In the steering apparatus, each of the contact portions may include an upper inclined surface and a lower inclined surface, the upper inclined surface may be obliquely formed from the flat surface to an upper end surface of the contact portion, and the lower inclined surface may be obliquely formed from the flat surface to a lower end surface of the contact portion.

Advantageous Effects

According to embodiments, since a protrusion including a spherical surface in point contact with a rib of a housing is provided, there is an advantageous effect in that a coupling property between a sensor module and a column housing is secured and movability is also secured.

In addition, since protrusions including flat surfaces in line contact with a rib of a column housing, there is an advantageous effect in that a coupling property between a sensor module and a column housing is secured and movability is also secured.

MODES OF THE INVENTION

Hereinafter, an exemplary embodiment of the present invention will be described with reference to the accompanying drawings in detail. Purposes, specific advantages, and novel features of the invention will be made clear from exemplary embodiments and the following detailed description in connection with the accompanying drawings. Terms and words used in this specification and claims are not to be interpreted as limited to commonly used meanings or meanings in dictionaries, and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

Figure 1:
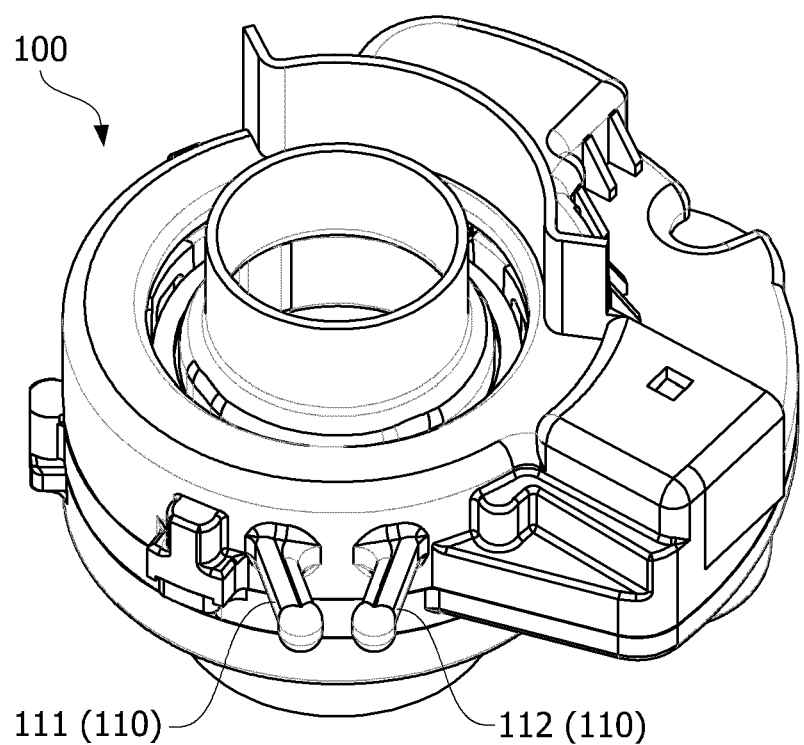
FIG. 1 is a view illustrating a sensor apparatus according to an embodiment.
Figure 2:
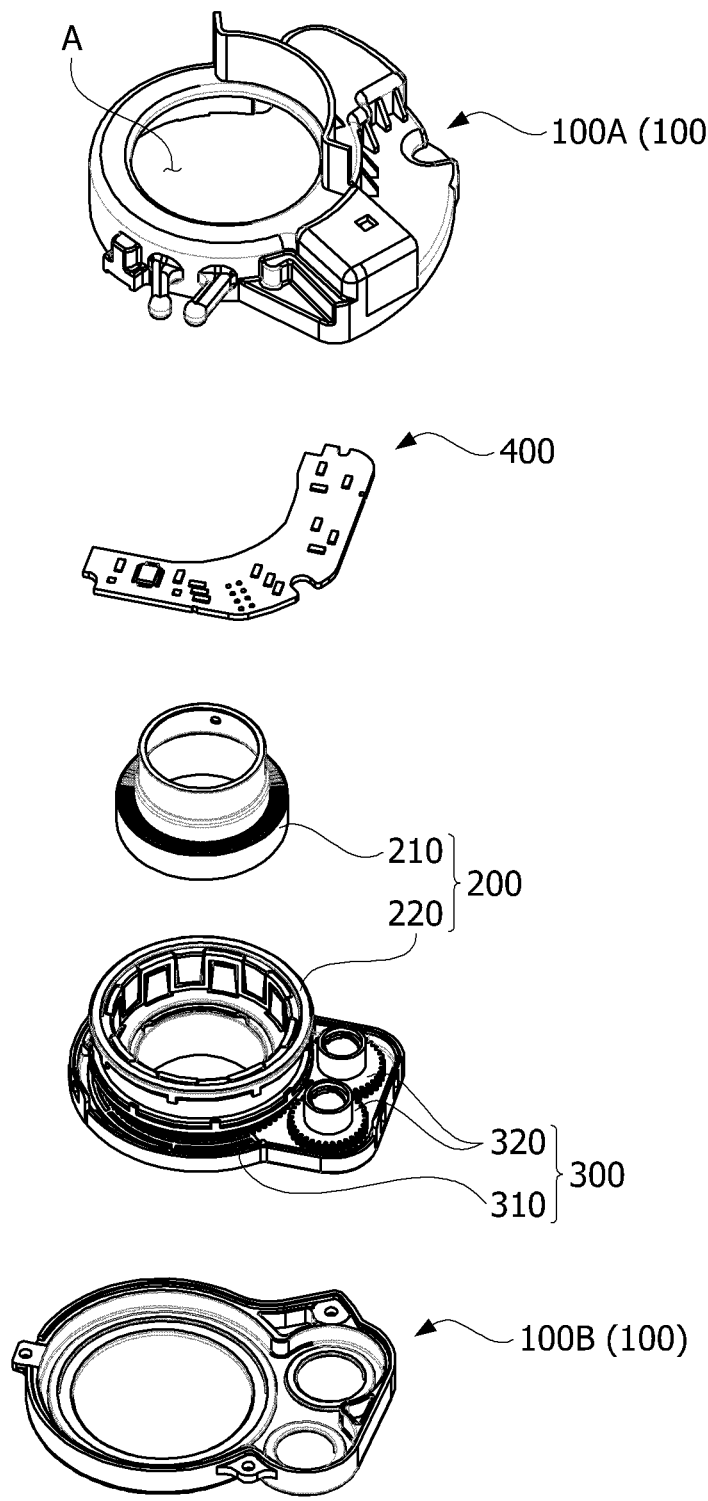
FIG. 2 is an exploded view illustrating the sensor apparatus illustrated in FIG. 1.

FIG. 1 is a view illustrating apparatus for sensing according to an embodiment and FIG. 2 is an exploded view illustrating the apparatus for sensing illustrated in FIG. 1.

Referring to both FIGS. 1 and 2, the sensor apparatus according to an embodiment may include a housing 100, a torque sensor module 200, and an angle sensor module 300.

The housing 100 may include an upper housing 100A and a lower housing 100B. The angle sensor module 300 and the torque sensor module 300 may be accommodated between the upper housing 100A and the lower housing 100B.

Any one of a first shaft and a second shaft defined in the embodiment may be an input shaft connected to a handle of a vehicle, and a remaining shaft may be an output shaft connected to wheels of the vehicle.

The torque sensor module 200 detects a magnetic field generated due to a torsion between the first shaft and the second shaft.

The torque sensor module 200 may include a rotor 210 connected to the first shaft and a stator 220 connected to the second shaft. A rotor core of the rotor 210 may be coupled to the first shaft, and a magnet may be attached to an outer circumferential surface of the rotor core. The rotor 210 may be rotatably disposed inside the stator 220. The stator 220 may be disposed such that two stator rings face each other, and the two stator rings may be accommodated in holders. In addition, the torque sensor module 200 may include a magnetic element configured to detect a magnetic field generated between the rotor 210 and the stator 220, a collector interposed between the magnetic element and the stator, and the like.

The angle sensor module 300 may include a main gear 310 which rotates in conjunction with the first shaft or the second shaft, and two sub gears 320 coupled to the main gear 310. The main gear 310 may rotate together with the second shaft. The sub gear 320 rotates according to rotation of the main gear 310. Here, magnets may be installed on two sub gears 320. Elements capable of detecting magnetic fields generated by rotation of the magnets installed on the sub gears may be formed on a printed circuit board, and the element may be any one of a magnetoresistive element (AMRIC) and a Hall integrated circuit (IC).

Figure 3:
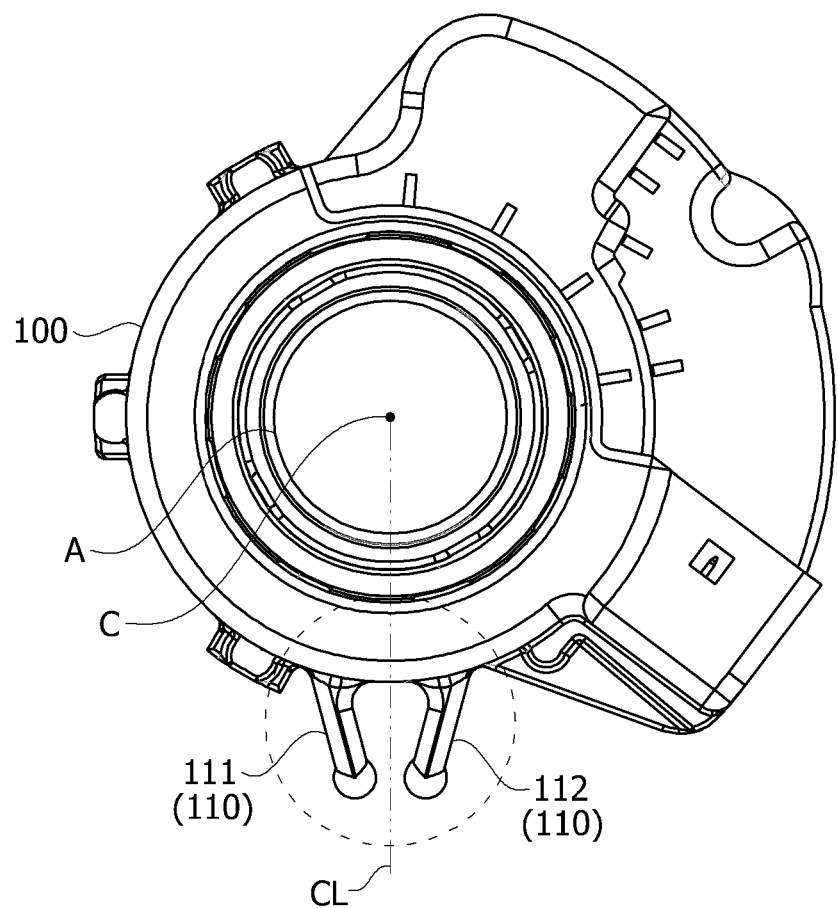
FIG. 3 is a view illustrating a protrusion of a housing.

FIG. 3 is a view illustrating a protrusion of a housing.

Referring to FIG. 3, a center hole A into which the first shaft and the second shaft are inserted may be formed in the housing 100. In addition, a protrusion 110 may be provided to protrude from an outer circumferential surface of the housing 100. The protrusion 110 is a part for coupling the housing 100 to a column housing.

Figure 4:
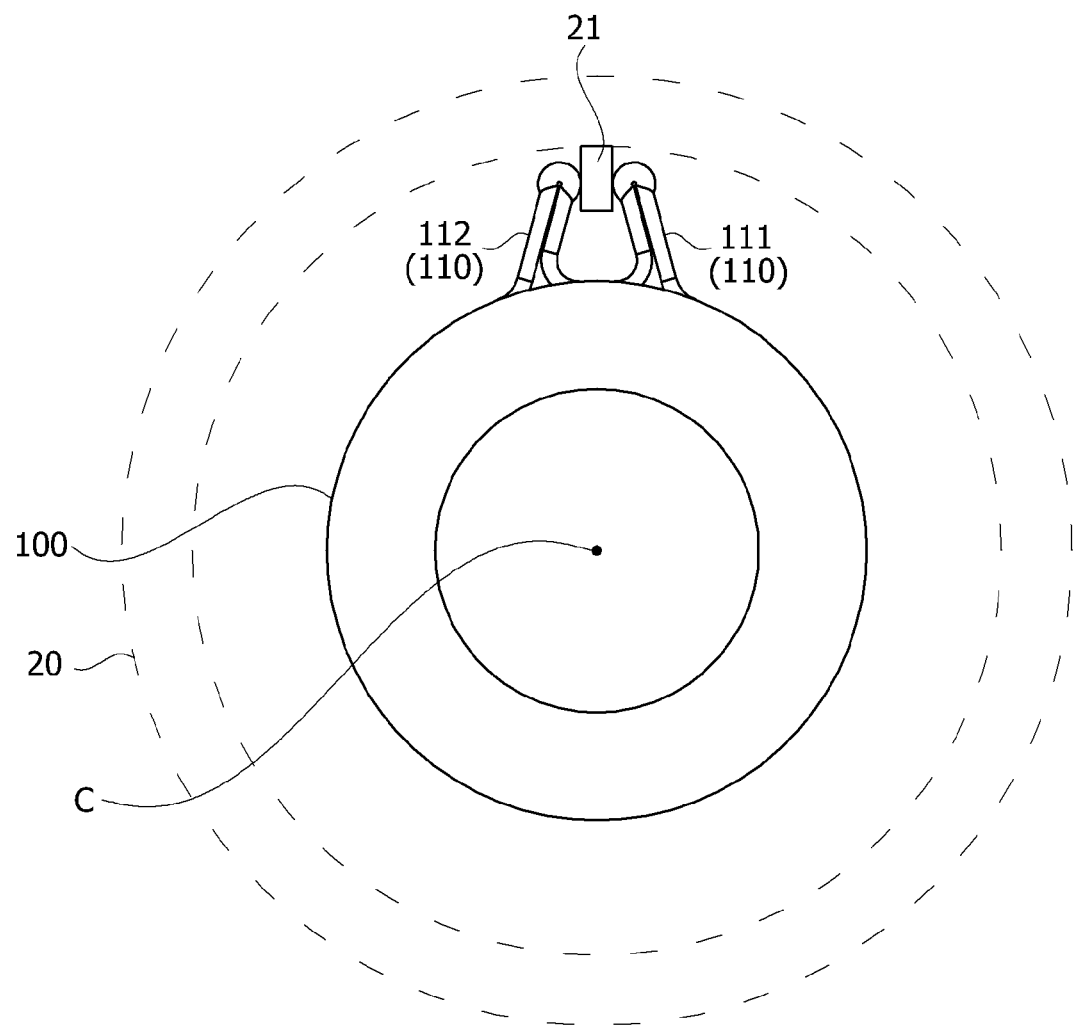
FIG. 4 is a view illustrating a rib of a column housing.

FIG. 4 is a view illustrating a rib of the column housing.

Referring to FIGS. 3 and 4, a rib 21 may be formed to protrude inward from an inner wall of a column housing 20.

The rib 21 is fitted in the protrusion 110. A side surface of the rib 21 may include a flat contact surface. In addition, a cross section of the rib 21 may have a rectangular shape.

The protrusion 110 may include a first clip 111 and a second clip 112. The first clip 111 and the second clip 112 are formed to protrude from the outer circumferential surface of the housing 100. An accommodation space for accommodating the rib 21 is formed between the first clip 111 and the second clip 112. The first clip 111 and the second clip 112 may be formed to be elastically deformable according to an external force.

Figure 5:
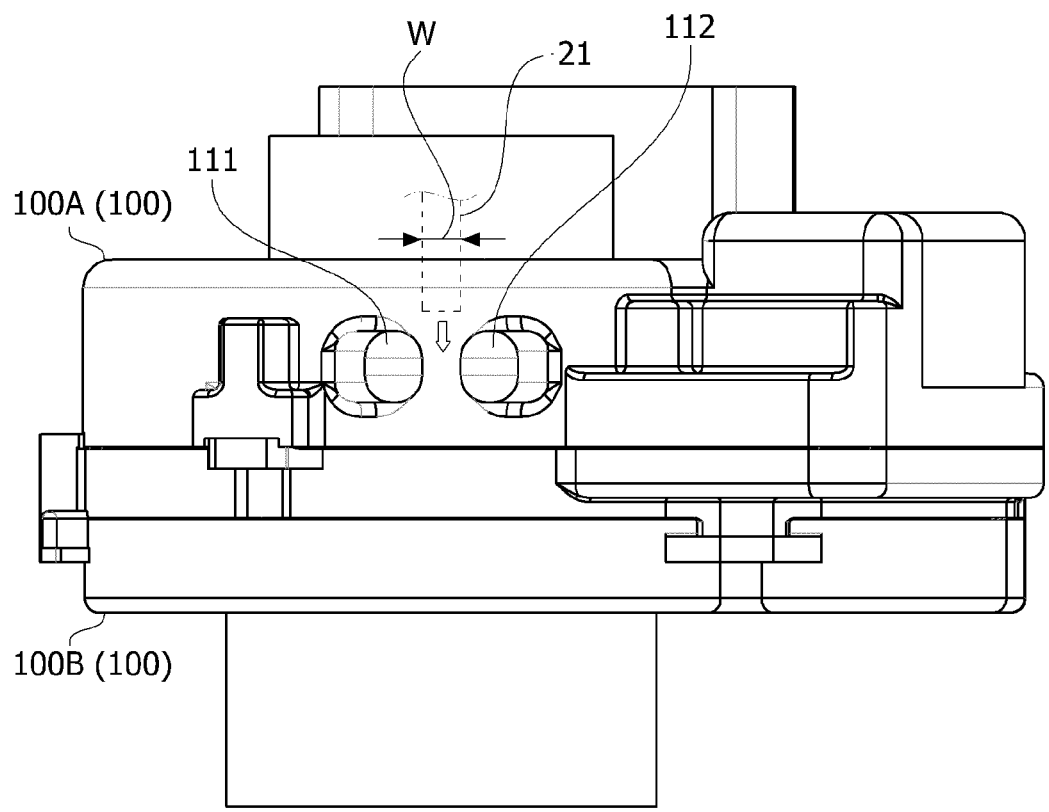
FIG. 5 is a side view illustrating the housing in which the protrusion is coupled to the rib of the column housing.

FIG. 5 is a side view illustrating the housing in which the protrusion is coupled to the rib of the column housing.

Referring to FIG. 5, as the rib 21 is inserted into the accommodation space between the first clip 111 and the second clip 112, the housing 100 may be fixed to the column housing 20 (see FIG. 4).

Figure 6:
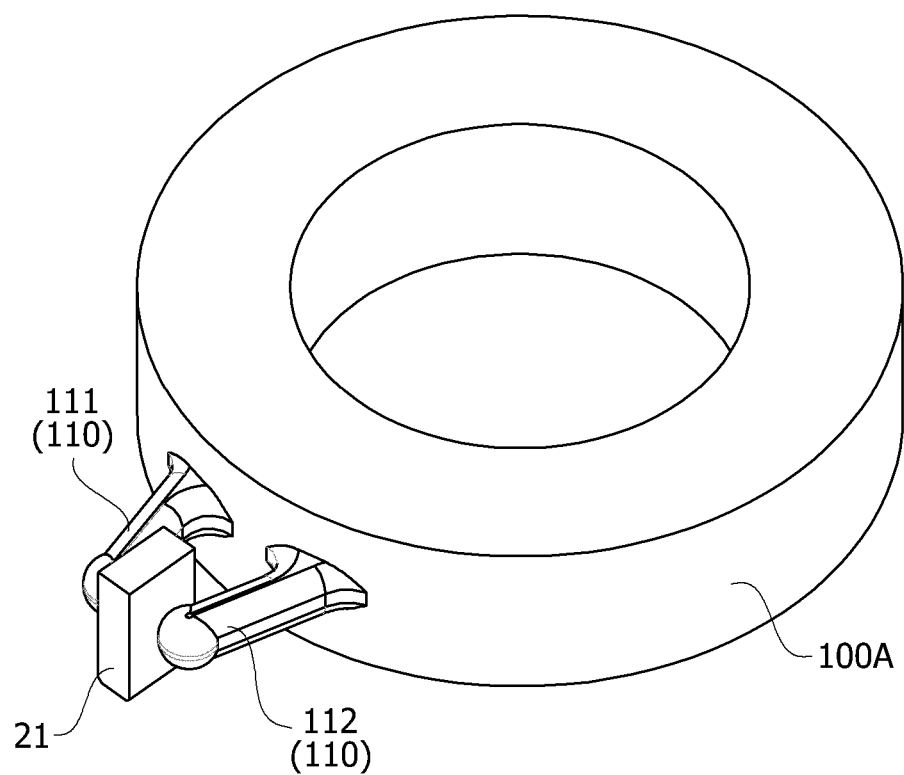
FIG. 6 is a view illustrating a state in which the rib and the protrusion are coupled.
Figure 7:
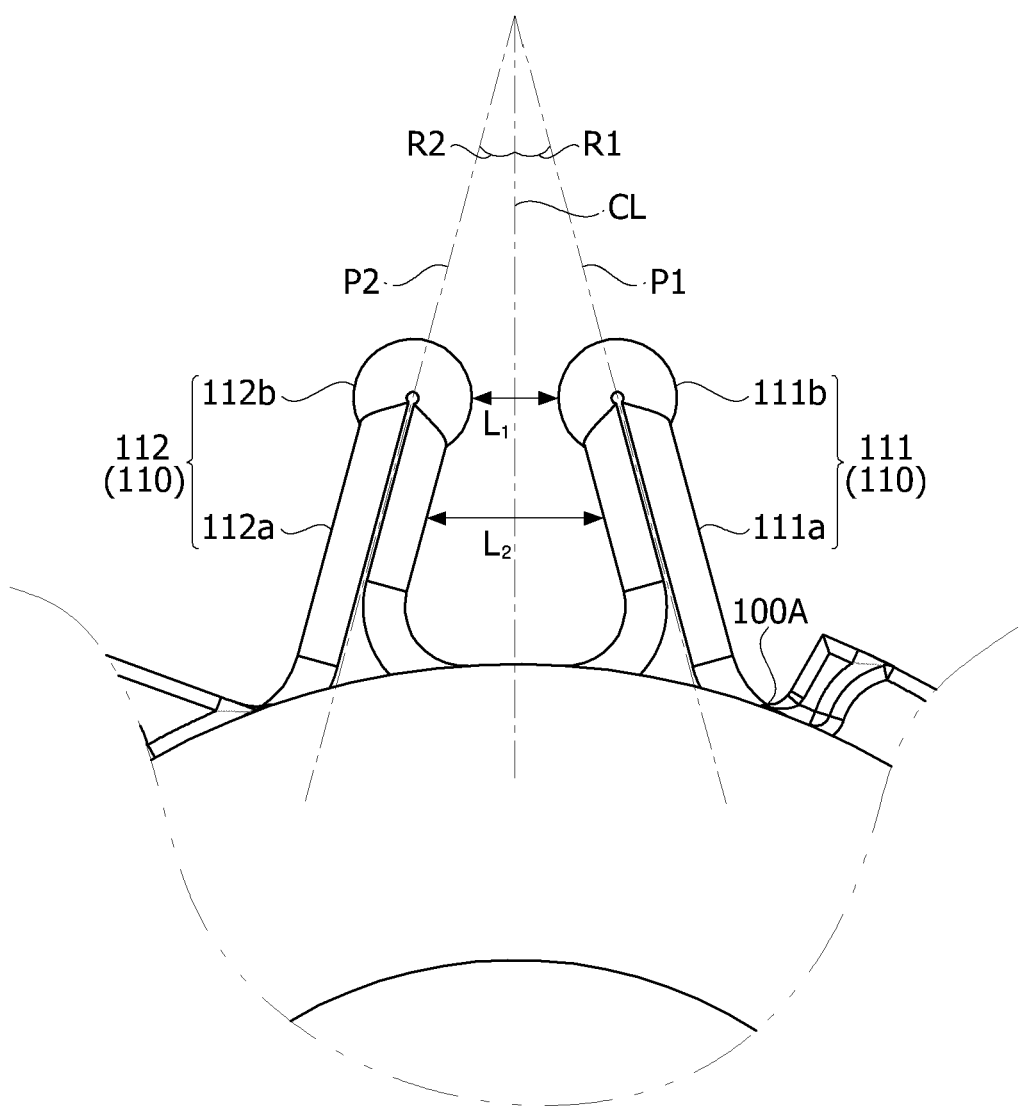
FIG. 7 is a view illustrating the fixing part.

FIG. 6 is a view illustrating a state in which the rib and the protrusion is coupled, and FIG. 7 is a view illustrating the fixing part.

Referring to FIG. 6, the rib 21 is fitted in the protrusion 110. That is, the rib 21 is fitted between the first clip 111 and the second clip 112. The first clip 111 and the second clip 112 may include column portions 111a and 112a and tip portions 111b and 112b.

The column portions 111a and 112a are formed to protrude from the outer circumferential surface of the housing 100. In addition, the tip portions 111b and 112b may be formed at leading ends of the column portions 111a and 112a. The column portions 111a and 112a may be formed to be elastically deformable. The tip portions 111b and 112b may include spherical surface in point contact with the rib 21. For example, the tip portions 111b and 112b may also include spherical surfaces in globular shapes or semi-globular shapes.

Meanwhile, referring to FIG. 7, a minimum distance from the tip portion 111b of the first clip 111 to the tip portion 112b of the second clip 112 is referred to as L1. A minimum distance from the column portion 111a of the first clip 111 to the column portion 112a of the second clip 112 is referred to as L2.

Here, L1 may be less than a thickness W (see FIG. 5) of the rib 21. In addition, L1 may be less than L2.

In a state in which the rib 21 is fitted between the first clip 111 and the second clip 112, the tip portions 111b and 112b are in point contact with the side surface of the rib 21. This is because the tip portions 111b and 112b include the spherical surfaces.

In addition, since L1 is less than the thickness W of the rib 21, the tip portions 111b and 112b elastically press the rib 21.

Meanwhile, the column portions 111a and 112a may be obliquely formed such that L1 is less than L2. That is, a reference line P1 formed in a longitudinal direction of the column portion 111a of the first clip 111 may be inclined with respect to the outer circumferential surface of the housing 100 in order to form an inclination angle R1 with respect to a center line CL passing through a center C of the housing 100. In addition, a reference line P2 formed in a longitudinal direction of the column portion 112a of the second clip 112 may be inclined with respect to the outer circumferential surface of the housing 100 in order to form an inclination angle R2 with respect to the center line CL passing through the center C of the housing 100.

The column portions 111a and 112a are formed to be close toward the tip portions 111b and 112b. When the rib 21 is fitted in the tip portions 111b and 112b, the tip portions 111b and 112b are distanced from each other. Such a structure including the column portions 111a and 112a may be advantageous in increasing resistance to internal stresses of the column portions 111a and 112a.

The column portions 111a and 112a may be formed such that cross sectional areas thereof increase toward the housing 100 in order to increase structural stability.

A length of the column portion 111a of the first clip 111 may be equal to that of the column portion 112a of the second clip 112. A size of the tip portion 111b of the first clip 111 may be equal to that of the tip portion 112b and the second clip 112. However, the embodiment is not limited thereto, and the length of the column portion 111a of the first clip 111 may be different from that of the column portion 112a of the second clip 112 to correspond to a shape of the rib 21. In addition, the size of the tip portion 111b of the first clip 111 may also be different from that of the tip portion 112b of the second clip 112.

Since the tip portions 111b and 112b are in point contact with the rib 21, the housing 100 may move vertically as well as laterally in a state in which the rib 21 is fixed to the housing 100. Accordingly, there is an advantage in that the housing 100 may move in various directions. Such a structure of the protrusion 110 is advantageous in easily absorbing external vibrations or impacts transmitted to the housing 100.

The housing 100 has high assemblability with the column housing 20. Even when a position of the rib 21 formed on the column housing 20 and a position of the protrusion 110 of the housing 100 are not accurately arranged, the housing 100 is advantageous in terms of assembling.

Figure 8:
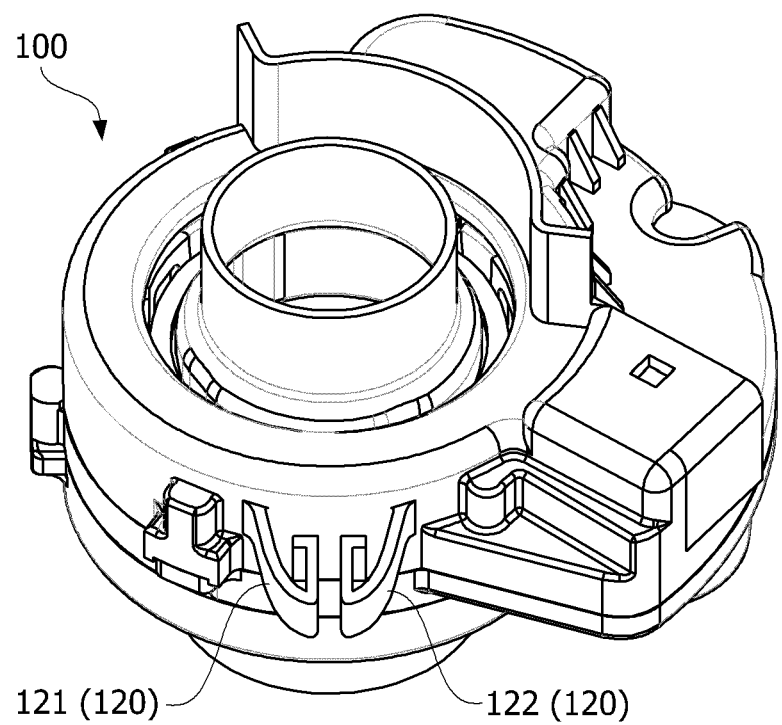
FIG. 8 is a view illustrating a sensor apparatus according to another embodiment.
Figure 9:
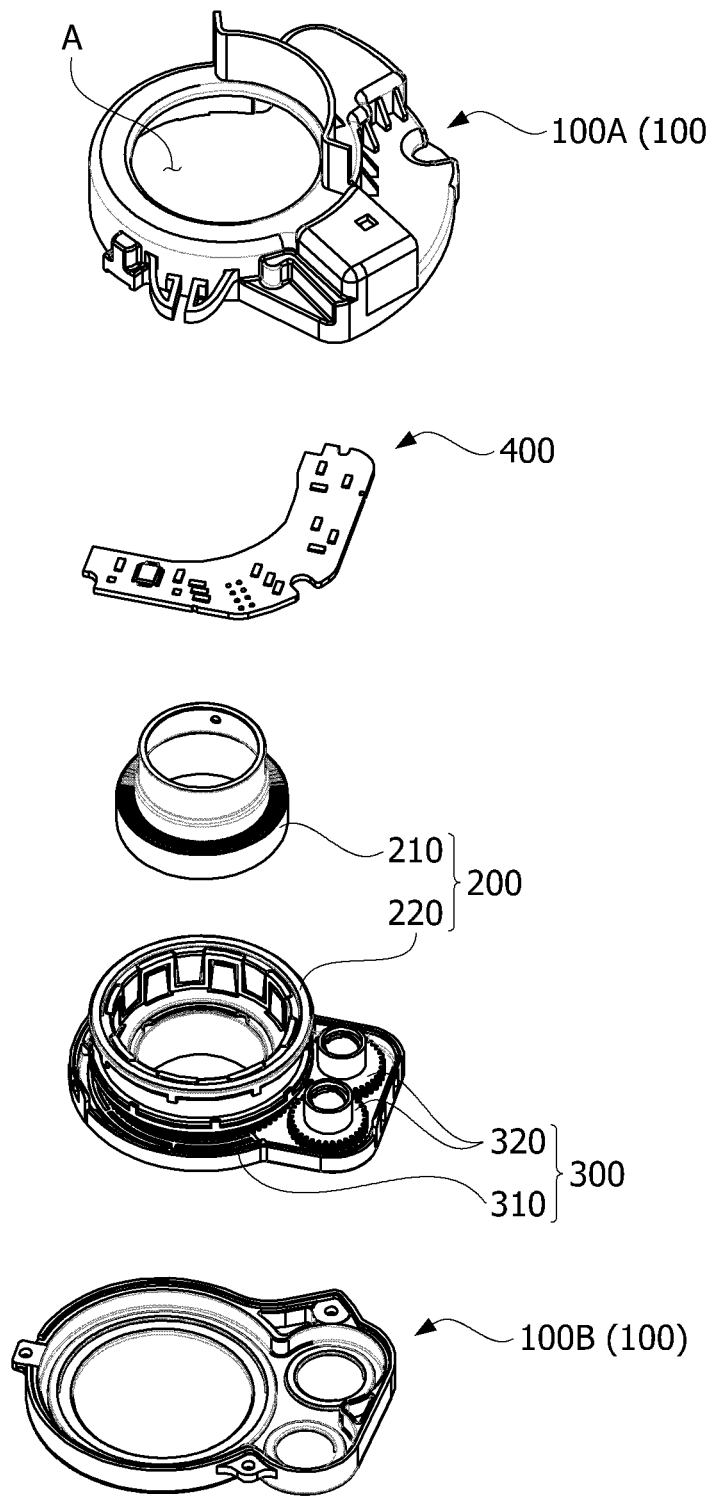
FIG. 9 is an exploded view illustrating the sensor apparatus illustrated in FIG. 8.

FIG. 8 is a view illustrating a sensor apparatus according to another embodiment, and FIG. 9 is an exploded view illustrating the sensor apparatus illustrated in FIG. 8.

Referring to both FIGS. 8 and 9, the sensor apparatus according to another embodiment may include a housing 100, a torque sensor module 200, and an angle sensor module 300.

The housing 100 may include an upper housing 100A and a lower housing 100B. The angle sensor module 300 and the torque sensor module 300 may be accommodated between the upper housing 100A and the lower housing 100B.

Any one of a first shaft and a second shaft defined in the embodiment may be an input shaft connected to a handle of a vehicle, and a remaining shaft may be an output shaft connected to a wheel of the vehicle.

The torque sensor module 200 detects a magnetic field generated due to a torsion between the first shaft and the second shaft.

The torque sensor module 200 may include a rotor 210 connected to the first shaft and a stator 220 connected to the second shaft. A rotor core of the rotor 210 may be coupled to the first shaft, and a magnet may be attached to an outer circumferential surface of the rotor core. The rotor 210 may be rotatably disposed inside the stator 220. The stator 220 may be disposed such that two stator rings face each other, and the two stator rings may be accommodated in holders. In addition, the torque sensor module 200 may include a magnetic element configured to detect a magnetic field generated between the rotor 210 and the stator 220, a collector configured to collect the magnetic field, and the like.

The angle sensor module 300 may include a main gear 310 which rotates in conjunction with the first shaft or the second shaft, and two sub gears 320 coupled to the main gear 310. The main gear 310 may rotate together with the second shaft. The sub gear 320 rotates according to rotation of the main gear 310. Here, magnets may be installed on two sub gears 320. Elements capable of detecting magnetic fields generated by rotation of the magnets installed on the sub gears, and the element may be one of an AMRIC and a Hall IC.

Figure 10:
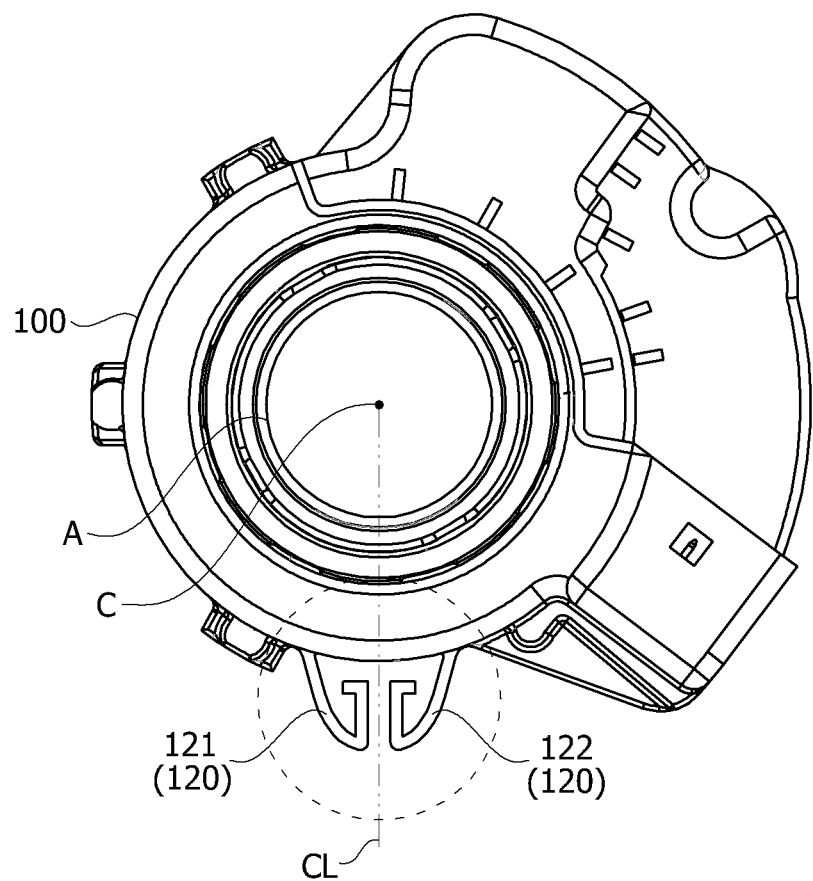
FIG. 10 is a view illustrating protrusions of a housing

FIG. 10 is a view illustrating protrusions of a housing

Referring to FIG. 10, a center hole A into which the first shaft and the second shaft are inserted may be formed in the housing 100. In addition, protrusions 120 may be provided to protrude from an outer circumferential surface of the housing 100. The protrusions 120 are parts for coupling the housing 100 to a column housing.

Figure 11:
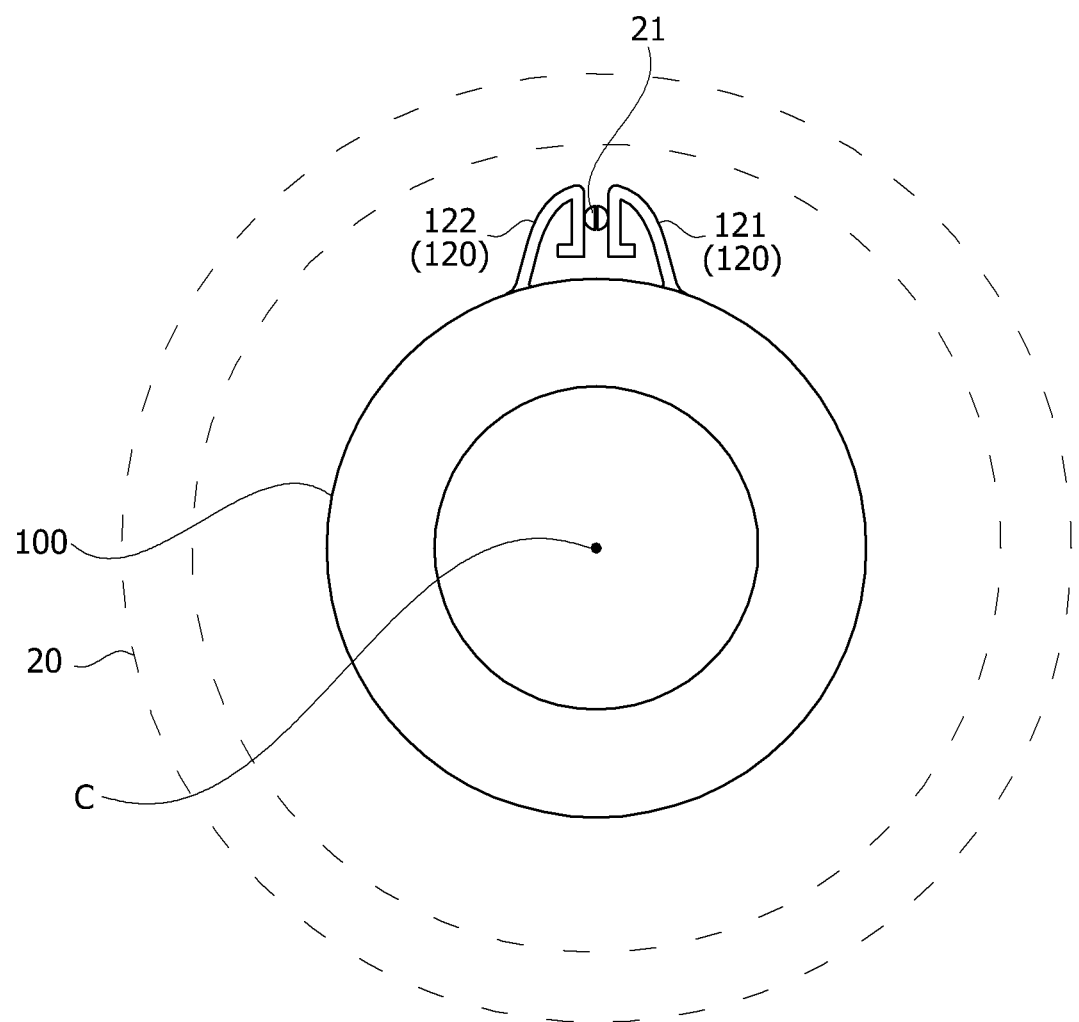
FIG. 11 is a view illustrating a rib of a column housing.

FIG. 11 is a view illustrating a rib of the column housing.

Referring to FIGS. 10 and 11, a rib 21 may be formed on a column housing 20. The rib 21 is fitted between the protrusions 120.

A pair of protrusions 120 (121 and 122) may be formed to protrude from the outer circumferential surface of the housing 100. An accommodation space configured to accommodate the rib 21 is formed between the pair of protrusions 120 (121 and 122). The protrusions 120 are formed to be elastically deformed according to an external force.

Figure 12:
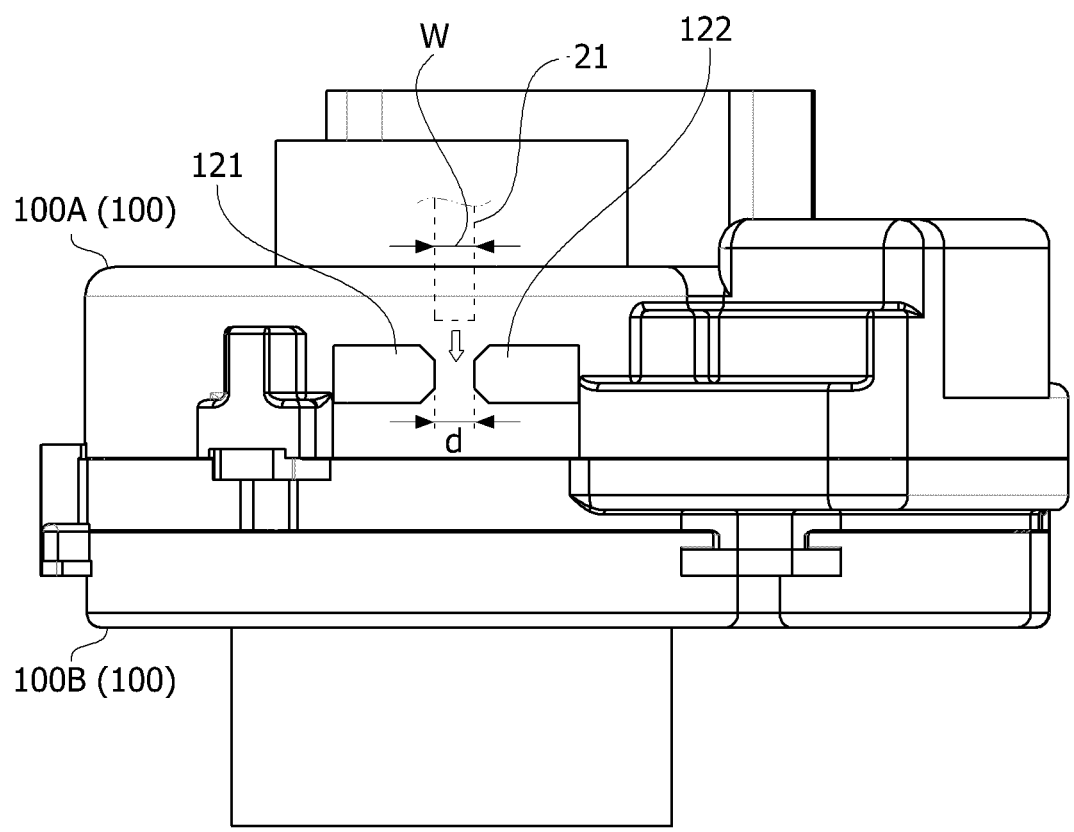
FIG. 12 is a side view illustrating the housing in which the protrusions are coupled to the rib of the column housing.
Figure 13:
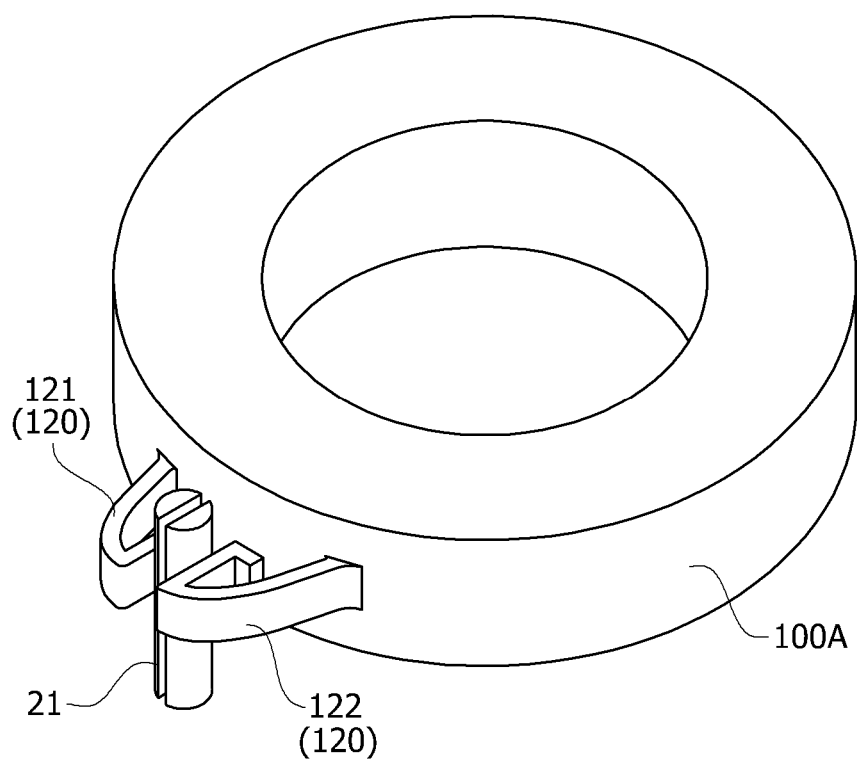
FIG. 13 is a view illustrating a state in which the rib and the protrusions are coupled.

FIG. 12 is a side view illustrating the housing in which the protrusions are coupled to the rib of the column housing, and FIG. 13 is a view illustrating a state in which the rib and the protrusions are coupled.

Referring to FIGS. 12 and 13, since the rib 21 is inserted into the accommodation space between the pair of protrusions 120 (121 and 122), the housing 100 may be fixed to the column housing 20 (see FIG. 11). Here, a minimum distance d between the pair of protrusions 120 (121 and 122) may be less than a thickness W (see FIG. 12) of the rib 21.

Figure 14:
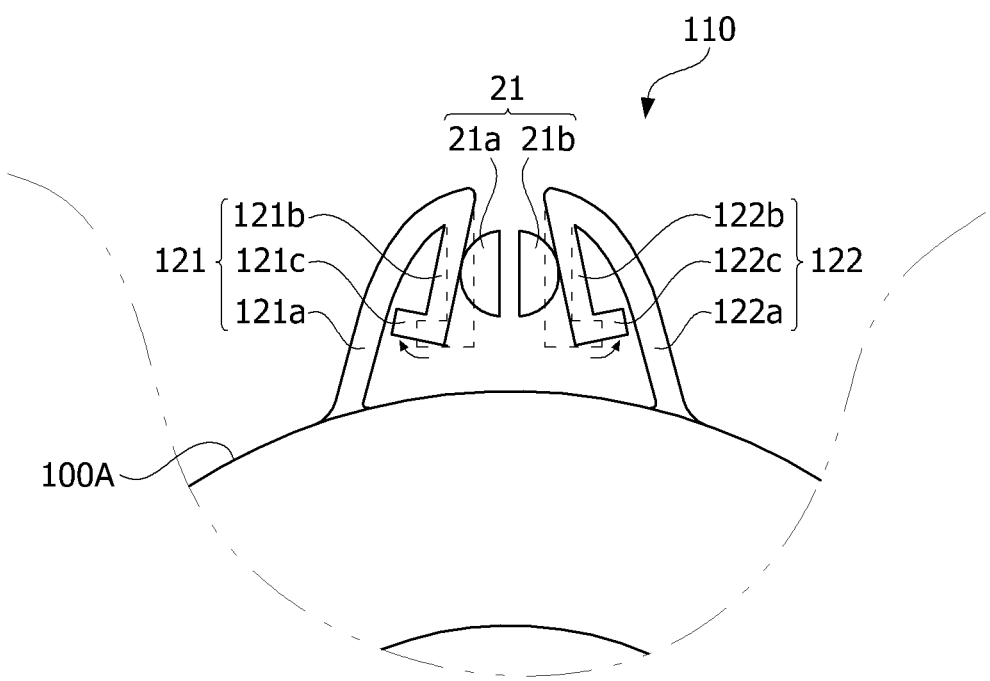
FIG. 14 is a view illustrating a state in which the rib and the protrusions are coupled.
Figure 15:
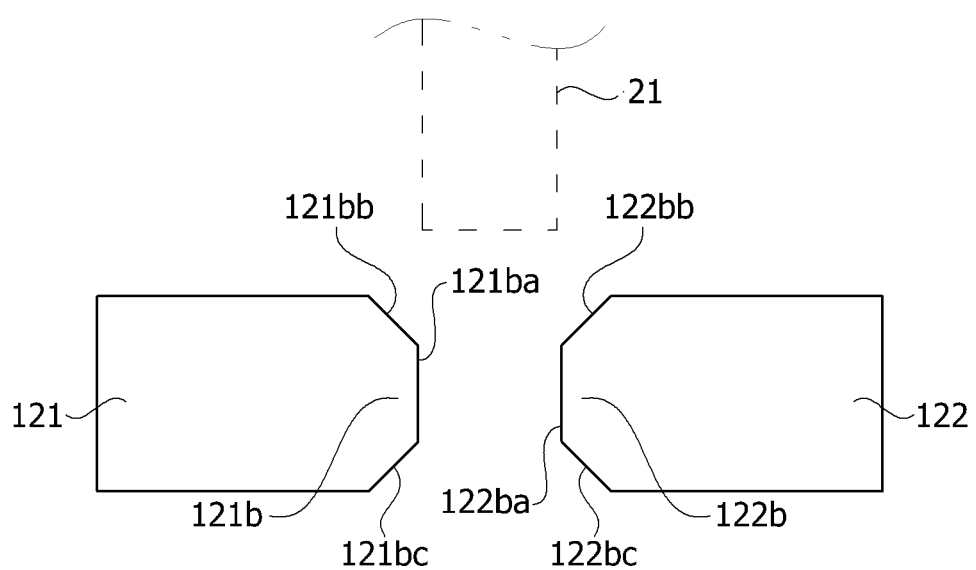
FIG. 15 is a front view illustrating the protrusions.

FIG. 14 is a view illustrating a state in which the rib and the protrusions are coupled, and FIG. 15 is a front view illustrating the protrusions.

Referring to FIG. 14 and FIG. 15, the protrusions 120 (121 and 122) may include elastic portions 121a and 122a and contact portions 121b and 122b. The contact portions 121b and 122b are portions configured to be in contact with rib 21, and the elastic portions 121a and 122a elastically connect the housing 100 to the contact portions 121b and 122b. Stoppers 121c and 122c may be formed to extend from ends of the contact portions 121b and 122b.

Surface members having predetermined thicknesses and band shapes may be curved and bent to form the protrusions 120 (121 and 122). That is, the elastic portions 121a and 122a, contact portions 121b and 122b, and the stoppers 121c and 122c may be divided and described according to shapes and functional characteristics, but may also be one portion in which the elastic portions 121a and 122a, contact portions 121b and 122b, and the stoppers 121c and 122c are vertically connected.

The elastic portions 121a and 122a are formed to protrude from the outer circumferential surface of the housing 100. Since the elastic portions 121a and 122a are coupled to the housing 100 to have cantilever shapes, the elastic portions 121a and 122a are easily elastically deformed. The two elastic portions 121a and 122a include spherical surface in which end portions are bent to be close to each other at positions at which the elastic portions 121a and 122a face each other.

The contact portions 121b and 122b may be formed to be bent from ends of the elastic portions 121a and 122a toward the housing 100. The contact portions 121b and 122b may include flat surfaces 121ba and 122ba configured to be in line contact with the rib 21.

The flat surface 121ba of any one protrusion 121 is disposed to face the flat surface 122ba of another protrusion 122.

Here, the rib 21 may be formed to include spherical surface configured to be in line contact with the flat surfaces 121ba and 122ba of the protrusions 120. For example, the rib 21 may be formed in a cylindrical shape.

The rib 21 may be divided into a first rib 21a and a second rib 21b. A separation space is formed between the first rib 21a and the second rib 21b. In addition, the first rib 21a may be in contact with the flat surface 121ba of any one protrusion 121. The second rib 21b may be in contact with the flat surface 122ba of another protrusion 122. The first rib 21a and the second rib 21b may have half cylindrical shape of which cross sections are semi-circles.

Since the space is provided between the first rib 21a and the second rib 21b, when the rib 21 is inserted between the protrusions 120, the rib 21 is easily elastically deformed. Restoring forces of the first rib 21a and the second rib 21b increase a coupling force between the housing 100 and the column housing 20.

Meanwhile, the stoppers 121c and 122c may be formed to be bent from ends of the contact portions 121b and 122b toward the elastic portions 121a and 122a. The stoppers 121c and 122c serve to prevent the contact portions 121b and 122b from being excessively deformed.

As illustrated in FIG. 14, when the rib 21 is inserted between the protrusions 120, the rib 21 presses against the flat surfaces 121ba and 122ba of the protrusion 120, and the contact portions 121b and 122b are distanced from each other. Since the contact portions 121b and 122b, which are distanced, press the rib 21 with the restoring forces, the coupling force between the housing 100 and the column housing 20 is secured.

Since elastic displacement ranges of the contact portions 121b and 122b are large due to the contact portions 121b and 122b in line contact with the rib 21 and a structure of the bent protrusions 120 formed to be bent, the housing 100 may move vertically as well as laterally in a state in which the rib 21 is fixed to the housing 100. Accordingly, there is an advantage in that the housing 100 moves in various directions. Such a structure of the protrusions 120 has an advantage in that external vibrations or impacts transmitted to the housing 100 are easily absorbed.

Referring to FIG. 15, the contact portion 121b of any one protrusion 121 may include an upper inclined surface 121bb and a lower inclined surface 121bc. The upper inclined surface 121bb is obliquely formed from the flat surface 121ba to an upper end surface of the contact portion 121b. In addition, the lower inclined surface 121bc is obliquely formed from the flat surface 121ba to a lower end surface of the contact portion 121b.

In addition, the contact portion 122b of another protrusion 122 may include an upper inclined surface 122bb and a lower inclined surface 122bc. The upper inclined surface 122bb is obliquely formed from the flat surface 122ba to an upper end surface of the contact portion 122b. In addition, the lower inclined surface 122bc is obliquely formed from the flat surface 122ba to a lower end surface of the contact portion 122b.

When the rib 21 is inserted between the protrusions 120 from above or below, the upper inclined surfaces 121bb and 122bb and the lower inclined surfaces 121bc and 122bc expand an entrance through which the rib 21 is inserted to induce the rib 21 to be more fluently inserted into the accommodation space.

The housing 100 has very high assemblability with the column housing 20. Even when a position of the rib 21 formed on the column housing 20 and positions of the protrusions 110, 120 of the housing 100 are not accurately arranged, the housing 100 is advantageous in terms of assembling.

While the present invention has been particularly described with reference to exemplary embodiments, it will be understood by those of skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

REFERENCE NUMERALS

20: COLUMN HOUSING 21: RIB
100: HOUSING 110,120: PROTRUSION 111: FIRST CLIP 112: SECOND CLIP
121A, 122A: ELASTIC PORTION
121B, 122B: CONTACT PORTION
121BA, 122BA: FLAT SURFACE 121C, 122C: STOPPER
200: TORQUE SENSOR MODULE 210: ROTOR
220: STATOR
300: ANGLE SENSOR MODULE
310: MAIN GEAR 320: SUB GEAR

The invention claimed is:

1. A sensor apparatus comprising:
a rotor;
a stator disposed outside the rotor;
a sensing part configured to measure a magnetic field generated between the rotor and the stator;
a housing which accommodates the rotor and the stator;
a sensor module disposed in the housing; and
a protrusion which protrudes from an outer circumferential surface of the housing and includes a spherical surface in point contact with an external fixing part.

2. The sensor apparatus of claim 1, wherein the protrusion includes a first clip and a second clip which protrude from the outer circumferential surface of the housing to face each other and between which an accommodation space in which the external fixing part is accommodated is formed, and
wherein each of the first clip and the second clip includes a column portion formed on the outer circumferential surface of the housing and a tip portion which is formed at a leading end of the column portion and has the spherical surface.

3. The sensor apparatus of claim 2,
wherein the tip portion of the first clip is in point contact with one surface of the external fixing part in the form of a protrusion, and the tip portion of the second clip is in contact with the other surface of the external fixing part in the form of a protrusion.

4. The sensor apparatus of claim 2, wherein:
the column portion is elastically deformed; and
a first distance which is a minimum distance from the tip portion of the first clip to the tip portion of the second clip is less than a second distance which is a minimum distance from the column portion of the first clip to the column portion of the second clip.

5. The sensor apparatus of claim 4, wherein the first distance is less than a thickness of the external fixing part.

6. The sensor apparatus of claim 3, wherein the column portion is obliquely formed with respect to a reference line which passes through a center of a center hole in a radial direction.

7. A sensor apparatus comprising:
a rotor;
a stator disposed outside the rotor;
a sensing part configured to measure a magnetic field generated between the rotor and the stator; and
a housing which accommodates the rotor and the stator,
wherein the housing includes a pair of protrusions which protrude from an outer circumferential surface thereof, each of the protrusions separately includes an elastic portion, a contact portion and a stopper, the elastic portion to elastically connect the housing to the contact portion, the contact portion to be bent from the elastic portion toward the housing, and the stopper to extend from an end of the contact portion toward the elastic portion.

8. The sensor apparatus of claim 7, wherein the pair of protrusions protrude from the outer circumferential surface of the housing to face each other.

9. The sensor apparatus of claim 8, wherein a first distance which is a minimum distance between the contact portions of the pair of protrusions is less than a thickness of an external fixing part to be accommodated between the contact portions of the pair of protrusions.

10. The sensor apparatus of claim 7, wherein:
each of the contact portions includes an upper inclined surface and a lower inclined surface;
the upper inclined surface is obliquely formed from a flat surface to an upper end surface of the contact portion; and
the lower inclined surface is obliquely formed from the flat surface to a lower end surface of the contact portion.

* * * * *